UNITED STATES PATENT OFFICE.

MICHAEL ILJINSKY, OF UERDINGEN, GERMANY, ASSIGNOR TO THE FIRM OF R. WEDEKIND & CO. M. B. H., OF UERDINGEN, GERMANY.

PROCESS OF MAKING ACID DYES OF THE ANTHRACENE SERIES.

996,487. Specification of Letters Patent. Patented June 27, 1911.

No Drawing. Application filed June 22, 1910. Serial No. 568,349.

*To all whom it may concern:*

Be it known that I, MICHAEL ILJINSKY, a subject of the Czar of Russia, and residing at Uerdingen-on-the-Rhine, Germany, have invented a certain new and useful Process for Making Acid Dyes of the Anthracene Series, of which the following is a specification.

Anthraflavic acid has hitherto not been employed for condensations with aromatic amins in the manufacture of dye-stuffs. Although the introduction of amin residues into oxyanthraquinones has been suggested in a general way, the only oxyanthraquinones specifically mentioned as having been successfully employed in the process, are: chinizarin, purpurin, oxyanthrapurpurin, oxyflavopurpurin, anthrachryson, alizarin-bordeaux, alizarin-pentacyanin, alizarin-hexacyanin, hexaoxyanthraquinone. In other processes by which various oxyanthraquinone derivatives are combined with aromatic amins, no mention is made of dyes which have anthraflavic acid as a starting material, nor of anthraflavic acid itself, nor of its derivatives.

My researches have disclosed that many derivatives of anthraflavic acid are extremely well adapted, under various conditions, to be combined with aromatic amins, and that the products of condensation obtained in the process yield exceedingly valuable brown, brownred violet-red, blue and blue-green acid dyes. Suitable anthraflavin derivatives for this purpose are:

(A) Dinitrodisulfoanthraflavic acid, made by sulfonating anthraflavic acid without the addition of boric acid and thereafter nitrating the sulfonated product. According to Dr. Adolf Winther: "*Zusammenstellung der Patente auf dem Gebiete der Organischen Chemie*", Vol. II, page 659, the product has probably the structural formula:

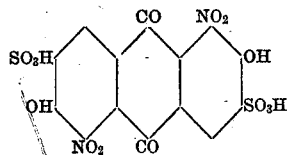

(B) The same sulfonated with the addition of boric acid and then nitrated. The structural formula of this compound is not yet known.

(C) The same sulfonated with the addition of mercury, in the presence or absence of boric acid, and then nitrated. The structural formula of this compound is not yet exactly known, the $SO_3H$ groups are probably in the $a$ position.

(D) Nitrated products of the dichloranthraflavinsulfonic acids made by chlorinating anthraflavic acid in the presence of an alkali, by then sulfonating the product formed with or without the addition of boric acid, and by finally nitrating the chlorinated and sulfonated product. The structural formulæ of these products are still unknown. The condensation preferably takes place in the presence of the hydrochlorids of the corresponding aromatic amins. Very favorable results with the dichloranthraflavinsulfonic acids are effected by the simultaneous use of sulfur, sodium-sulfid and aromatic amins. The nitrated anthraflavinsulfonic acids give dark blue dye-stuffs; the chlorated products are suited for the production of brown dyes.

The following examples show the manner of working:

1. 10 parts of the potassium salt of the dinitrodisulfoanthraflavic acid (made by sulfonating anthraflavic acid in the presence of boric acid and by following nitrating), 5 parts of muriatic anilin, 50 parts anilin, are heated for about 6 hours to from 140° to 145° C. in a vessel equipped with a return-cooler. The product of condensation is then freed from the anilin which has not been reacted upon, by either distilling off the anilin with steam after the contents of the vessel have been made alkaline, or by extracting from the product of condensation the anilin with a dilute solution of muriatic acid. In the former case the product freed from anilin, is separated by filtration into an alkali-insoluble and an alkali-soluble part. By acidulating and subsequent filtrating, the latter is divided into a water-soluble and a water-insoluble portion, which is however soluble in alkali and which remains on the filter, while the water-soluble dye-stuff is precipitated from the solution by means of salt. In case the excess anilin has been extracted with acid and by subsequent filtration, the residue is separated into a water-soluble, an alkali-soluble and an insoluble part in a similar manner. The alkali-soluble part of the product yields a water soluble blue-red powder, which dyes unmordanted or mordanted wool violet. By subsequent chromating with bichromate, a vivid, dark coloring shade similar to indigo-blue is obtained, which completely satisfies the most exacting demands as to permanency or fastness of color. If the condensation with anilin is carried out without the addition of anilin salt, quite similar results are obtained by a sufficiently long-continued heating.

2. 10 parts of nitrated dichloranthraflavinsulfonic acid, 2 parts of sulfur, 4 parts of crystallized sodium-sulfid, 50 parts of anilin, are heated for two hours in a vessel with a return-cooler at from 125° to 130° C. The alkali-soluble part of the product dyes prechromated, or un-mordanted wool or the latter subsequently treated with bichromate, a pure brown shade, which, even with the unmordanted wool, answers the most exacting demands as to fastness.

3. 10 parts of nitrated dichloranthraflavin sulfonic acid, 2 parts of sulfur, 4 parts of sodium-sulfid, 50 parts of p-toluidin are heated at 110° C. for 2 hours. The alkali-soluble part of the product dyes wool similar to that of Example 2, a permanent olive-brown-shade.

From the examples cited, not only the great facility of the derivatives of the anthraflavic acid to react with the aromatic amins, but also the great variety of the dye-stuffs produced by the process becomes apparent. This property of the anthraflavic acid is exceeding surprising, and it was not to be forseen in view of the rigid symmetrical arrangement of the two hydroxyls in the compound.

After having described my invention, what I claim is:—

1. In the process of producing acid dyes, the condensation of anthraflavin derivatives, formed by sulfonating and nitrating anthraflavic acid, with aromatic amins, substantially as described.

2. In the process of producing acid dyes, the condensation of anthraflavin derivatives, formed by sulfonating and nitrating anthraflavic acid, with aromatic amins in the presence of means of condensation, substantially as described.

3. In the process of producing acid dyes, the condensation of anthraflavin derivatives, formed by sulfonating and nitrating anthraflavic acid, with aromatic amins in the presence of means of condensation, and the following separation of the products formed into water-soluble and alkali-soluble dyestuffs and an alkali-insoluble part, substantially as described.

4. In the process of producing acid dyes, the condensation of nitrated derivatives of dichloranthraflavin-sulfonic acid with aromatic amins in the presence of sulfur and sodium-sulfid, substantially as described.

In testimony whereof I have signed my name to this specification, in the presence of two subscribing witnesses.

MICHAEL ILJINSKY.

Witnesses:
HENRY AUADPLIEG,
ELISE KALBURCH.